Nov. 26, 1968  W. F. BARG, JR., ET AL  3,413,208
PURIFICATION OF STREPTOKINASE BY ZONE ELECTROPHORESIS
USING A DENSITY-GRADIENT COLUMN
Filed Feb. 19, 1963

INVENTORS
WILLIAM F. BARG, JR
PAUL H. BELL
MAURICE C. DAVIES
EDWARD C. DeRENZO
BY
ATTORNEY

United States Patent Office 3,413,208
Patented Nov. 26, 1968

3,413,208
PURIFICATION OF STREPTOKINASE BY ZONE ELECTROPHORESIS USING A DENSITY-GRADIENT COLUMN
William Frederic Barg, Jr., Monsey, N.Y., Paul Hadley Bell, Ridgewood, N.J., Maurice Charles Davies, Tappan, N.Y., and Edward Clarence De Renzo, Hillsdale, N.J., assignors to American Cyanamid Company, Stamford, Conn., a corporation of Maine
Filed Feb. 19, 1963, Ser. No. 259,637
5 Claims. (Cl. 204—180)

This invention relates to an improved method of purifying crude streptokinase by zone electrophoresis.

Streptokinase, an enzyme produced as an extra cellular product by streptococci, has been used extensively for the treatment of clots or thrombi which form in the blood stream. These clots, which are formed of fibrin, are dissolved by a fibrinolytic enzyme plasmin. The plasmin is formed from its precursor plasminogen in the blood stream, and streptokinase is a strong activator for transforming the plasminogen to the active plasmin. Preparations of streptokinase have been used extensively for therapy against clotting and have the advantage that they induce actual solution of the clot instead of merely preventing its formation as do some of the anticoagulant drugs which have also been used and which are almost purely preventative in action.

When streptokinase is separated from the streptococci cultures it is not a pure product but is contaminated by a number of substances some of which show pyrogenic activity. As a result the cruder streptokinase preparations have sometimes produced side effects which are undesired and their activity is not at a maximum. Various methods have been proposed in order to increase the concentration of streptokinase in preparations and to reduce the undesired associated contaminates. These processes have been successful but only to a degree. The present invention permits a further purification even of already partially purified streptokinase preparations which have a purity that is at present considered practically useful. The invention of course can also be applied to cruder and less pure streptokinase compositions.

Essentially the present invention depends on the discovery that streptokinase, which is a protein, can be separated from contaminants, some of which may also be other proteins, by zone electrophoresis employing a density gradient using certain definite procedures. Zone electrophoresis which involves separation of various compounds such as various proteins, depends on their developing a different net charge so that the degree which they travel under a direct current potential will cause them to separate into different zones. It is an advantage of the present invention that more or less known general types of electrophoresis systems may be employed and it is therefore not necessary to develop completely new principles of electrophoretic separations. It is not known exactly what the contaminant proteins in the streptokinase mixtures are but it is known that there are a number of different proteins present. The invention operates because it has been determined and observed that these unknown proteins acquire a net charge sufficiently different from the net charge on streptokinase so that effective separation takes place.

The present invention should not be confused with the analytical use of zone electrophoresis on crude cultures of hemolytic streptococci to determine in fact that they do contain proteins among which are included streptokinase. There was no appreciation until the present invention was made that streptokinase and its associated contaminant proteins were capable of acquiring different net charges so that the proteins could be separated in a practical manner from each other by zone electrophoresis. In other words the present invention is not based on observing that streptokinase is a protein and that it is capable of acquiring a charge and of migrating under electrophoretic conditions. What was not known and the important, vital factor on which the present invention is based, is that the streptokinase protein can acquire a net charge which is sufficiently different from its contaminating proteins to permit separation. The contaminating proteins are not known except that it is definitely assured that they are present because of the undesired side reactions which occur. The chemical composition of these unwanted contaminant proteins is completely unknown. What has been determined and the new result obtained by the present invention is that these contaminant proteins produce a different net charge than does the streptokinase protein itself. Therefore the present invention is in no sense limited to any theories as to what the contaminant protein or proteins may be and since the effect of the present invention is to separate these contaminant proteins from streptokinase their chemical composition is a matter of complete indifference.

The electrophoresis process herein employed relates to producing a density gradient in a liquid, for example, differences in concentration of a nonelectrolyte in solution.

In the present process certain requirements of good electrophoretic procedure are observed. Thus there must be produced in a liquid an electrophoretic channel in which convection does not take place and cooling is also vital because there is quite a substantial flow of direct current in the electrophoretic process which can cause heating up of the materials and distortion of the zones. In the present process good cooling is used which is not contrary to good electrophoretic practice in the past and so requires the learning of no new techniques. While the exact temperature which is to be maintained is not critical, it is preferred to maintain the temperature between about 1° and 5° C. for best results.

While it is an advantage of the present invention that no radically new electrophoretic techniques are required there is a choice of buffers some of which are preferred. The best buffer is tris-boric acid. The use of this buffer permits the maintenance of a pH in the range in which best results are obtained namely from slightly above 7 to 8, the latter being preferred for optimum results although the pH is not critical and a considerable variation from the optimum figure is permissible. The fact that the pH is not critical to the extent that it requires difficult controls is an operating advantage of the present invention. As in other electrophoretic operations it is desirable to start with an organic mixture more or less free from inorganic salts. It is therefore desirable to dialyze the crude streptokinase before subjecting it to purification.

The liquid density-gradient process of the present invention effects real economic advantage in the use of the preferred buffer tris-boric acid because this buffer does not present problems due to electrolysis at cathode or anode. This does not mean that other buffers may not be used but where they are subject to electrolysis it is necessary to keep cathode and anode compartments physically separated from the main electrophoretic channel, for example by connecting through U-tubes. With tris-boric acid as a buffer this is not necessary and so a somewhat simpler apparatus setup is made possible. This is one of the reasons why this buffer is preferred but the invention operates quite satisfactorily with other buffers when the necessary precautions are taken.

The invention will be described in greater detail in conjunction with the drawings in which.

Figure 2:
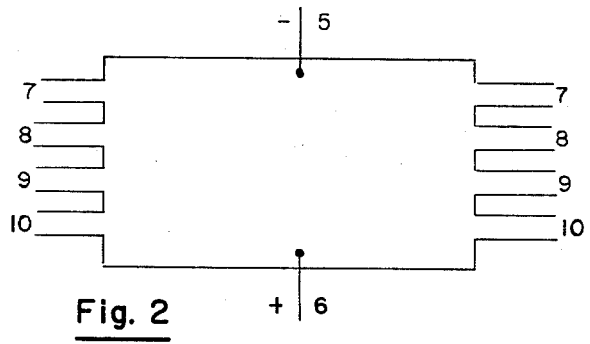
FIG. 2 is a section through a continuous multilayer horizontal channel.

The invention will also be described in conjunction with specific examples which set forth typical operating conditions. However before describing the examples the general methods illustrated in the drawings will first be described. Since the electrophoretic apparatus is not a new thing in the present invention the drawings are largely diagrammatic in form.

Figure 1:
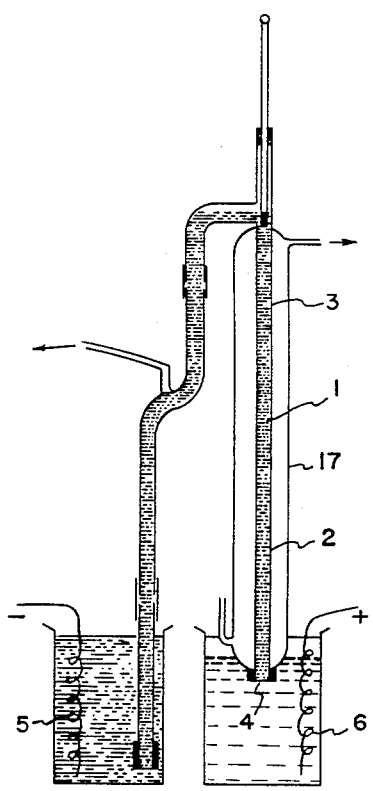
FIG. 1 is a section through a liquid density-gradient column.

In FIG. 1 there is a column 1 with a gradient of various densities of sucrose solution 2, the density varying from 0% of sucrose to approximately 50% and increasing from the top to the bottom. The bottom of the column is closed off by a membrane 4 which may be of regenerated cellulose which permits passage of electric current but prevents migration of protein molecules and holds the liquid in the column. The column is provided with the conventional cooling jacket 17. Near the top of the column there is a more dilute gradient 3. At the interface between this gradient and the main column length 2 the sample of streptokinase to be purified is introduced suitably dispersed in a buffer of the right density. The introduction may be by means of a syringe and fine plastic tubing introduced through the top of the column which extends to the interface. A cathode compartment is shown at 5 connected with a sidearm at the top of the column. The sidearm however can be dispensed with when the preferred buffer tris-boric acid is used. At the bottom of the column is an anode compartment 6. Suitable DC electrode connections to the cathode and anode are made in the customary manner of electrophoretic instruments and a voltage gradient produced in the column. A small DC current unavoidably results.

After electrophoresis has been completed which may take from 15 to 20 hours, the anode compartment 6 is removed and the membrane 4 punctured allowing the contents of the column to flow out gradually. The streptokinase rich fraction is collected when it appears. This can be located by determining protein in the collected fractions first, for example by the general technique of Folin-Ciocalteu reagent as determined by the method of Lowry et al. [J. Biol. Chem. 193, 265 (1951)], or by observing optical density at about 280 mu with a suitable ultraviolet spectrophotometer. The streptokinase is further localized by specifically determining streptokinase in the collected fraction by the method of Christensen [J. Clin. Invest. 28, 163 (1949)].

FIG. 2 shows a modification which permits continuous operation. Here the same reference numerals are applied to the same elements of the apparatus. The chamber is in the form of an elongated horizontal chamber with a cathode and anode 5 and 6 applied to bottom and top respectively. The ends of the chamber are perforated to produce a number of inlet ports 7, 8, 9 and 10 with correspondingly numbered outlet ports at the same level. In full sized equipment the ports usually number about 32 but a smaller number is shown for clarity of illustration. A slow laminar flow through the apparatus is produced by suitable roller pump so that the time of flow corresponds to that sufficient for a complete electrophoresis. The exit ports are connected to separate receivers and the receiver in which the streptokinase rich fraction is collected is retained the others being discarded.

The following examples are provided for illustrative purposes and may include particular features of the invention, however, the examples should not be construed as limiting the invention, many variations of which are possible without departing from the spirit or scope thereof.

EXAMPLE 1

A variable density gradient is produced in a column shown in FIG. 1 by starting with a 50% sucrose solution in a buffer formed of a water solution of 0.013 N tris-0.16 M boric acid at a pH of 7.2. The column size is 2.5 by 62 cm. and the streptokinase charge is a solution of 73 mg. of commercial purified streptokinase in 3 ml. of the buffer. The current is about 4 ma., the voltage being 12.5 volts per cm. Electrophoresis is maintained for a period of approximately 17 hours. The electrode compartments are then removed, the membrane 4 punctured and column contents gradually permitted to flow out collecting separately the streptokinase rich zone as described in connection with FIG. 1.

The streptokinase concentration of the original charge was approximately 15,000 units per mg. of protein. The concentrate obtained had approximately 60,000 units per mg. of protein and thus represented a concentration of four times. There was some loss of streptokinase but approximately 60% was recovered in the form of highly active concentrate.

EXAMPLE 2

The conditions of Example 1 were followed but the charge was 96 mg. of crude streptokinase in 3 ml. of buffer. A current of 3–4 ma. was maintained with a voltage of about 10 volts per cm. the electrophoresis continuing for slightly over 17 hours.

The starting material had about 40,000 units per mg. of protein and the streptokinase rich fraction, about 84,000 units. Recovery was from 60 to 75% of the total streptokinase present.

EXAMPLE 3

Example 2 was repeated but the electrophoresis was continued for about 26.6 hours. An increase in the concentration of streptokinase was obtained, the rich fraction showing about 95,000 units. Losses of streptokinase were somewhat greater.

EXAMPLE 4

Continuous equipment was set up as described in FIG. 2, the length of the cell being 50 centimeters, height 50 centimeters and width 2 centimeters. The 50-centimeter sides were provided with cooling jackets as of course is the case in the preceding three examples since the operations were carried out at a low temperature. In FIG. 1 a cooling jacket was shown but this was not included in FIG. 2 as it is diagrammatic and the need for cooling is not changed by the present invention. The ends of the electrophoresis cell are provided with 32 ports. Each port has tube connections to attach to a roller pump and the outlet ports are connected to separate receivers. The sucrose buffer solutions which are the same as described in the three foregoing examples are made up into 32 equal increments covering the density range from 0 to 50% of sucrose. The lightest solution enters the top port and the heaviest the bottom port. Residence time is approximately 17 hours which requires a pumping rate of about 9.2 ml. per port per hour.

The solution of streptokinase to be purified is introduced in either the third or fourth inlet port from the top, the density of the solution introduced being compatible with the density gradient at the particular level. Below the bottom of the cell there is a regenerated cellulose membrane and an anode compartment. In order to eliminate osmotic dilution at the bottom of the cell the anode compartment contains a 50% sucrose buffer solution. There is a top cathode 5 and the voltage is equal to 12.5 volts per centimeter. The cooling jackets are cooled with 1° C. cooling water and a cooling rate is maintained so that the exit temperature from the exit ports does not exceed 5° C. The whole apparatus is run in a cold room so that all solutions are at approximately operational temperature of the apparatus.

The exit port streams are analyzed for streptokinase and protein as described in the Examples 1 to 3 and the exit streams of the high streptokinase fraction are collected. The degree of purification is substantially the same as in Examples 1 to 3 but as the operation is continuous periodic removal of batches is unnecessary.

We claim:
1. A process of purification of streptokinase comprising in combination,
   (a) establishing an electrophoretic channel,
   (b) maintaining in the channel a variable density-gradient solution in buffer from top to bottom, the solution being of inert non-electrolyte, producing a direct current flow from the cathode in the top to an anode in the bottom of the channel,
   (c) introducing a solution of streptokinase composition, dissolved in a buffer, near the cathode, the buffer buffering to a pH of from about 7 to 8,
   (d) continuing the flow of current to produce electrophoresis until substantial separation of protein constituents results, and
   (e) identifying the zone of maximum streptokinase concentration and recovering it separately.

2. A process according to claim 1 in which the non-electrolyte is sucrose.

3. A process according to claim 2 in which the buffer is tris-boric acid.

4. A process according to claim 2 in which the gradient zones of buffer are moved slowly in laminar flow horizontally and are separately recovered, the electrophoretic current flowing from top to bottom at right angles to the flow, the flow being sufficiently slow so that electrophoretic separation of streptokinase from contaminant proteins is effected continuously.

5. A process according to claim 4 in which the buffer is tris-boric acid.

References Cited

UNITED STATES PATENTS

| | | | |
|---|---|---|---|
| 3,125,500 | 3/1964 | Grassman et al. | 204—180 |
| 2,547,231 | 4/1951 | Sartakoff | 204—180 |
| 2,878,178 | 3/1959 | Bier | 204—180 |
| 2,989,457 | 6/1961 | Van Oss et al. | 204—180 |
| 2,997,425 | 8/1961 | Singher | 195—66 |
| 3,042,586 | 7/1962 | Palombo | 195—66 |
| 3,098,015 | 7/1963 | Ayrupaa | 195—66 |
| 3,125,500 | 3/1964 | Grassman et al. | 204—180 |

FOREIGN PATENTS 784,539  10/1957  Great Britain.

OTHER REFERENCES

Chromatographic Reviews, ed. by M. Lederer, New York, Elsevier Publishing Co., vol. 3, 1961, pp. 63–66.

Brakke: "Archives of Biochemistry & Biophysics," Zone Electrophoresis of Dyes, Proteins and Viruses in Density-Gradient Columns of Sucrose Solutions, vol. 55, No. 1, March 1955, Academic Press, pp. 175–180, 182–190.

Dorby et al.: "Chemical Engineering Progress," Engineering Problems in Large-Scale Electrophoresis, vol. 54, No. 4, April 1958, pp. 59–63.

Ferris et al.: "The American Journal of Clinical Pathology," Electrophoresis of Serum Proteins in Acrylamide Gel, vol. 38, October 1962, pp. 383–387.

Fletcher et al.: "Proceedings of the Society for Experimental Medicine and Biology," vol. 94, pp. 233–236, 1957.

Heffman: "Chromatograph," pp. 267–270 and pp. 412–416, 1961.

Lederer: Chromatographic Reviews, vol. 3, 1961, pp. 63–66.

HOWARD S. WILLIAMS, *Primary Examiner.*

E. ZAGARELLA, *Assistant Examiner.*